United States Patent [19]

Wallace et al.

[11] Patent Number: 5,139,871

[45] Date of Patent: Aug. 18, 1992

[54] THERMOCHEMICALLY TREATED OLIGOMERIC AND/OR POLYMERIC DERIVED SILICON CARBIDE FIBERS

[75] Inventors: Jay S. Wallace, Silver Spring, Md.; Barry A. Bender, Springfield, Va.; Darla Schrodt, Columbia, Md.

[73] Assignee: The United States of America as represented by the Secretary of the Navy, Washington, D.C.

[21] Appl. No.: 143,491

[22] Filed: Jan. 13, 1988

[51] Int. Cl.$^5$ .................. B32B 9/00; D02G 3/00; C04B 35/52; C04B 35/02

[52] U.S. Cl. .................... 428/368; 427/249; 427/255; 428/367; 428/373; 428/375; 428/378; 428/408; 428/902; 501/88; 501/95

[58] Field of Search .......... 428/367, 368, 373, 392, 428/375, 408; 427/249, 255; 525/477; 523/307; 501/88, 95

[56] References Cited

U.S. PATENT DOCUMENTS

| | | | |
|---|---|---|---|
| 3,580,731 | 5/1971 | Milewski et al. | 427/249 |
| 4,068,037 | 1/1978 | DeBolt et al. | 428/368 |
| 4,196,233 | 4/1980 | Bitzer et al. | 427/249 |
| 4,340,636 | 7/1982 | DeBolt et al. | 428/215 |
| 4,618,529 | 10/1986 | Yamamura et al. | 428/408 |
| 4,657,991 | 4/1987 | Takamizawa | 525/477 |
| 4,743,411 | 5/1988 | Shimada | 523/307 X |
| 4,843,040 | 6/1989 | Oda et al. | 427/249 |

FOREIGN PATENT DOCUMENTS 0055076 6/1982 European Pat. Off. .
2080781A 2/1982 United Kingdom .

OTHER PUBLICATIONS

Lewis & Rice, "Further Assessment of Ceramic Fiber Coating Effects on Ceramic Fiber Composites", NASA Conf. Pub. 2406, pp. 13-26, 1985.

Bender et al., "Effect of Fiber Coatings and Composite Processing on Properties of Zirconia-Based Matrix SiC Fiber Composites", American Ceramic Society Butt., vol. 65, No. 2, pp. 363-369, Feb. 1986.

Primary Examiner—George F. Lesmes
Assistant Examiner—James D. Withers
Attorney, Agent, or Firm—Thomas E. McDonnell; Barry A. Edelberg

[57] ABSTRACT

Silicon carbide fibers which are derived from oligomeric and/or polymeric precursors are modified and strengthened in annealing the silicon carbide fiber at temperatures in excess of 800° C. under a nitrogen atmosphere in the presence of carbon particles. The modified fibers can be used to make ceramic, metal, and plastsic composites.

10 Claims, 3 Drawing Sheets

THERMOCHEMICALLY TREATED OLIGOMERIC AND/OR POLYMERIC DERIVED SILICON CARBIDE FIBERS

BACKGROUND OF THE INVENTION

1. Field of the Invention

This invention relates to a thermochemically treated silicon carbide fiber derived from organosilicon oligomeric and/or polymeric precursors including doped oligomers and polymers. The invention also relates to the process of thermochemically treating the fibers by annealing the oligomeric and/or polymeric derived silicon carbide fibers in an excess of carbon particles under an interactive gas atmosphere such as nitrogen gas.

2. Description of Related Art and Problems in the Art

Composites are structural materials formed by the combination of several materials. Composites are used where there is a need for a lighter weight structure which must be stronger, tougher, and able to survive harsher environmental and temperature cycling conditions which cannot be met by traditional unreinforced single materials or alloys. Composites provide the opportunity to design and fabricate structural material having specific chemical, thermal, mechanical, and electromagnetic properties. Composites can be fabricated from plastic, ceramic and/or metal materials.

Flaws of any size are likely to cause failure of loaded brittle ceramic or metal materials. This flaw intolerance tends to limit the use of brittle materials, particularly ceramics, in situations which require structural reliability.

Ceramic materials can be strengthened by the addition of fibers. The fibers may be composed of many materials depending on the particular composite and fabrication and operating conditions for that composite. Ceramic and metal composites can be strengthened by the addition of ceramic fibers formed by any of the very well known means or purchased from commercial sources.

Theoretically, the appropriate inclusion of fibers in a ceramic matrix, particularly high strength ceramic fibers, should increase the fracture toughness and strength of the ceramic product. In fact, it has been noted that the performance of ceramic fiber reinforced materials has fallen short of expectations.

Ceramic and metal composites are formed by hot pressing, rolling, molding, sintering, and other techniques in which the composites materials are subjected to high temperatures and pressures. These conditions tend to degrade the strength of known ceramic fiber materials, particularly those derived from organosilicon oligomeric and/or polymeric precursors. Both chemical and mechanical reasons have been identified for the poor results of oligomeric and/or polymeric derived reinforcing fibers. In some cases, chemical incompatibility between the fiber and the matrix results in such a poor bond between the matrix and the fiber that no load can be transferred to the fiber. In other cases the fiber and matrix react together causing too strong of a bond to form at the fiber/matrix interface. The fiber may also lose strength during the various densification processes used to form the composite. These changes in the fiber and the matrix ultimately lead to a weakening of the composite material as a whole.

The thermochemical instability of fibers derived from organosilicon oligomer and polymer precursors such as silicon carbide are a major limitation in the choice of processing conditions and matrix materials for the end product composite. The exact reasons for the degradation of, for example, oligomer and polymer-derived silicon carbide fibers is not completely understood. Degradation products such as silicon dioxide and carbon dioxide have been identified being exuded by the fibers. Some authors, such as Anderson and Warren, in "Silicon Carbide Fibers and Their Potential Use in Composite Materials, Part I Composites," Vol. 15 (No. 1) p. 16-24 (1984), propose crystallite growth, microporosity formation and (flaw) growth as possible reasons for fiber degradation.

Fiber surface coatings and fiber surface treatments have been proposed as means to prevent fiber degradation and to make the fiber more chemically compatible with the matrix. In U.S. Pat. No. 4,340,636 Debolt et al. suggest vapor phase treating a stoichiometric CVD silicon carbide filament to create a carbon rich silicon carbide surface which is more chemically compatible with organic polymers and alumina materials when forming composites with those materials.

Bender et al. have shown that a coating of boron nitride (BN) on the surface of a polymer-derived silicon carbide fiber strengthened the fiber matrix composite and they showed that the coating acted as a diffusion barrier to protect the fiber from oxidation or from volatilizaton from reactions with the matrix, Bender et al. "Effect of Fiber Coatings and Composite Processing on Property of Zirconia-Based Matrix Silicon Carbide Composites," American Ceramic Society Bulletin, Vol. 65, No. 2, Feb. 1986, p. 363-369.

Others have also suggested the use of boron nitride as a coating to strengthen ceramic fiber composites. Singh and Bruhn "Effect of Boron Nitride Coating on Fiber-Matrix Interactions" Ceram. Eng. Sci. Proc., 8 (7-8) pp. 636-643 (1987); Rice et al., "The Effect of Ceramic Fiber Coating on the Room Temperature Mechanical Behavior of Ceramic-Fiber Composites", Ceram. Eng. & Sci. Proc., 8th Annual Conference, July-August 1984, published by the American Ceramic Society, Columbus, Ohio, 1984; Lewis and Rice, "Further Assessment of Ceramic Coating Effects on Ceramic Fiber Composite", NASA Conf. Publ. 2406, Proceedings of a Joint NASA/DOD Conference, Jan. 23-25 1985.

SUMMARY OF THE INVENTION

In accordance with this invention, it has been found that modified fibers useful for inclusion in composite matrices, particularly metal and ceramic matrices, can be produced by annealing an organosilicon oligomer and/or polymer derived-silicon carbide fiber under an interactive gas atmosphere in the presence of carbon particles. The fibers of this invention have greater stability, greater flexibility, greater ability to retain physical and chemical properties at elevated temperatures and greater ability to retain these properties in the presence of aggressive environments.

Accordingly, the primary object of this invention is to produce a more stable surface-modified ceramic fiber derived from oligomeric and/or polymeric sources for use in composite material.

A further object of this invention is to provide a simple and inexpensive process for producing surface modified ceramic fibers for use in composite matrices.

Other objects, advantages, and novel features of the invention will become apparent from the following detailed description of the invention.

Figure 1:
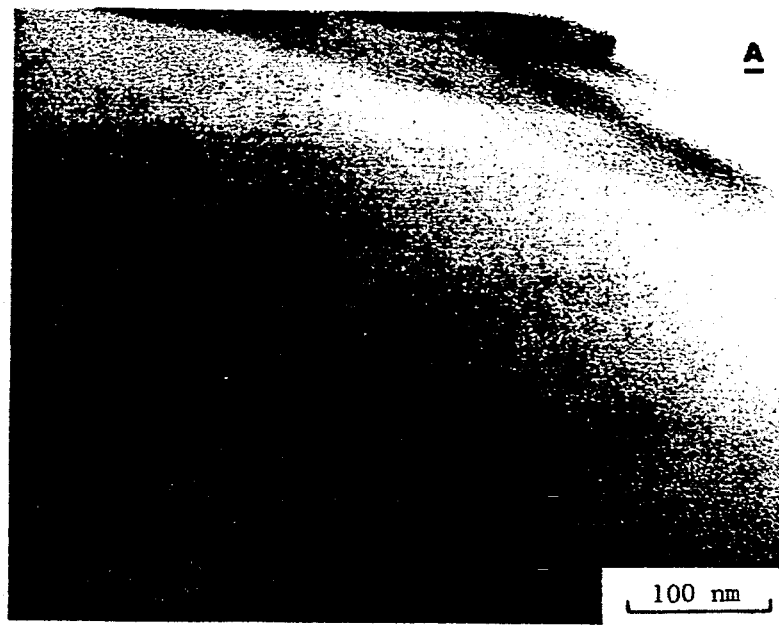
FIG. 1 is a transmission election micrograph (TEM) (A) Bright field (BF) and B) selected area diffraction pattern (SADP) of an untreated fiber showing the amorphous structure of the fiber.
Figure 1:
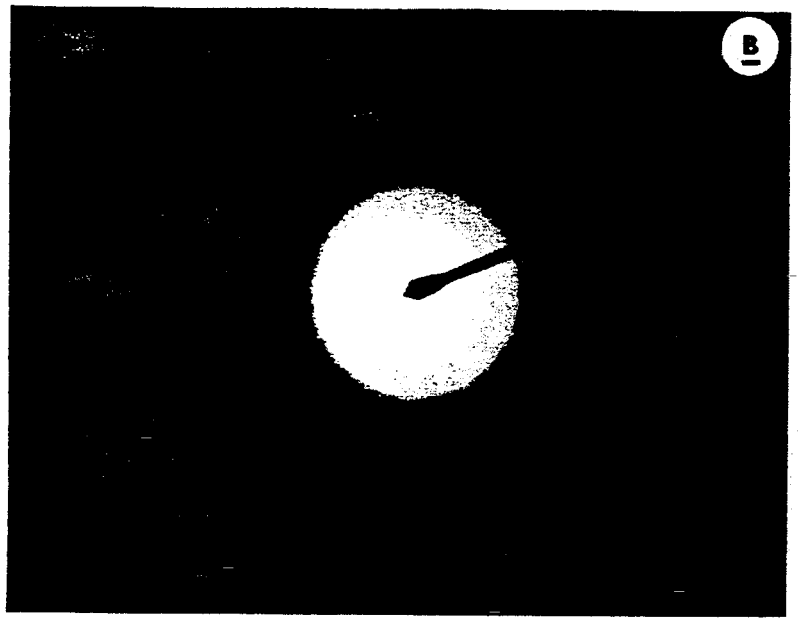

A more complete appreciation of the invention and many of the attendant advantages of the invention will be readily obtained and will become better understood by reference to the following detailed description when considered in connection with the accompanying drawings, wherein:

DESCRIPTION OF THE PREFERRED EMBODIMENTS

The surface modified fibers of this invention find use in composite matrices. The fibers of this invention are ceramic fibers derived from organosilicon oligomeric and/or polymeric precursers such as polycarbosilane or other silicon-carbon-hydrogen based polymers. These oligomer and polymer precursors can include other inorganic materials such as metals including zirconium, tungsten, titanium and the like. The techniques for the preparation of these ceramic fibers are well known and are described in U.S. Pat. No. 4,100,233 and European Patent Application 0,055,076 published Jun. 30, 1982. Included within this invention are strengthened fibers derived from all oligomeric and polymeric organosilicon precursors including those oligomers and polymers which are substituted with a metal group. Those polymers and oligomers containing metals will be referred to generally as doped. The term oligomeric/polymeric-derived fibers is intended to include those precursors which are doped as well as those which are not.

Generally, the strengthened fibers of this invention are made by first cutting the pyrolyzed fiber into appropriate length for use in composites. These lengths can be any length with practical limitations imposed by the size of the heat treatment furnace. Usually the fibers are between 50 and 100 millimeters in length and most conveniently are 75 millimeters in length. The fiber themselves may be specially prepared by techniques well known in the art or may be purchased commercially.

As needed, the cut ceramic fibers are cleaned by the appropriate methods to remove any sizing or other potential contaminants which may be on the fiber surface. These cleaning methods include heating the fibers sufficiently to drive off the sizing material or washing the fibers in the appropriate organic or inorganic solvents followed by drying the fibers.

Once cleaned, the cut fibers are dispersed and intimately placed in contact with carbon particles. The dispersion can take place by any well known means such as shaking the fibers and particles in air or in a solvent. When a solvent is used, the solvent is removed and the fiber-carbon particle mixture dried before further processing is applied.

The carbon particles used in the processes of this invention should be relatively pure carbon having a particle size sufficient to create good contact with the dispersed fibers. Preferably, the carbon should have a particle size averaging less than 20 um. Most preferably the average particle size should be less than 5 um.

The fibers dispersed in carbon are placed in a suitable vessel and annealed in the presence of a gas capable of reacting with the products and byproducts formed during the heating of the oligomeric and polymeric-derived silicon carbide fibers in the presence of the carbon particles. Preferably, the gas is nitrogen gas although other gases capable of reacting with the products and byproducts of the heating process are believed to be equivalent to nitrogen.

The dispersed fibers are heated to a temperature above 800° C. and maintained at that temperature for sufficient time for the fibers to be modified. Preferably, the fibers are heated in an annealing-type process from room temperature to a treatment temperature between 800° C. and 1800° C. and that temperature is maintained for a time sufficient for the fibers to be modified and then the fibers are cooled to room temperature. Most preferably, the fibers are heated to a temperature above 1100° C. and below 1600° C. The time necessary for the fibers to interact and be strengthened at the elevated temperature will vary from fiber to fiber under the different interactive gases. It is preferred that the fibers be treated for at least one hour and not more than 3 hours to provide sufficient time for the fibers to be modified while maintaining sufficient strength.

The invention may be better understood by a reference to a specific example.

EXAMPLE

A commercially available, titanium modified, polymer-derived silicon carbide fiber is cut into 75 mm sections. The fiber sold under the trade name Tyranno fiber is TRN-401, Lot 82D514 purchased from UBE Industries, American, Inc., New York. The cut fiber pieces are heated to 350° C. in an oven to remove the sizing. The cleaned fibers are then ultrasonically dispersed in hexanes together with carbon particles. The carbon powder is commerically available from Consolidated Astronautics, Inc. and is 99.9% pure, with a particle size average of $2 \times 10^{-6}$ meter, (2 micron) Lot 115, Hauppauge, N.Y. The hexanes-fiber-carbon mixture forms a slurry. After dispersion, the hexanes solvent is removed and the fiber-carbon dispersion is air dried. Then the carbon-fiber dispersion is placed in a covered aluminum oxide crucible. The crucible is placed in a graphite furnace which is supplied with flowing nitrogen gas. The furnace is heated in flowing nitrogen to 1600° C. and maintained at that temperature for 3 hours. The furnace is then cooled, the fibers are removed from the oven and are separated by known techniques from the carbon particle dispersion. These known techniques can include separating the fibers by hand or any of the methods used to separate wheat from chaff.

Fibers treated by the method of this invention were compared by scanning electron microscope (SEM), transmission electron microscope (TEM), X-ray diffraction (XRD) and optical microscopy. The tensile strength of treated and untreated fiber was determined in an apparatus which is modeled after the ASTM standard D3379-75/10/ using a 12.5 mm gauge length and a loading time of approximately 10 seconds. Because the loading closely approximates dead weight loading, traces of the fiber cannot be located after testing so it was not possible to determine flaw origins. Cross sections of the fiber were prepared for TEM examination by ion thinning fibers which are imbedded in an epoxy.

As seen in FIG. 1, the typical silicon carbide fiber before treatment does not have a distinct microstructure or crystalline grain structure. This indicates the fiber is either amorphous or the crystallite structure is too fine to be seen. X-ray diffraction and TEM analysis indicates that these fibers are microcrystalline, consisting primarily of silicon carbide, with a crystallite size less than one nanometer ($4 \times 10^{-8}$ inches). A tensile strength test, which is a test where fiber is broken by pulling it along its length, indicates the as-received-fiber has a strength averaging 3.5 GPa (500,000 lbs./in$^2$). For comparison, typical commercial ceramics average about 10 MPa (15,000 lbs per sq. in.) and the normal aluminum alloys used in aircraft have strengths of about 300-500 MPa (45,000-70,000 lbs. per sq. in.).

SEM examination of fracture surfaces of treated fibers compared to untreated fibers show differences between the two. Fibers which were not packed in carbon had surfaces which were relatively smooth. The fracture surfaces of carbon packed fibers had a granular or pebbly surface with rounded 50-100 nm features. In addition, there were changes within the core of the fiber.

The core of the heated fiber changed from amorphous to a more mottled appearance with 1-2 nm silicon carbide crystals being formed. These microstructural changes along with the evolution of 30 nm voids indicate that, during heating, atomic mobility is permitting material to proceed in the direction of an equilibrium phase assemblage. The core structure of treated and untreated fiber does not vary greatly but the surface structure does as described.

Figure 2:
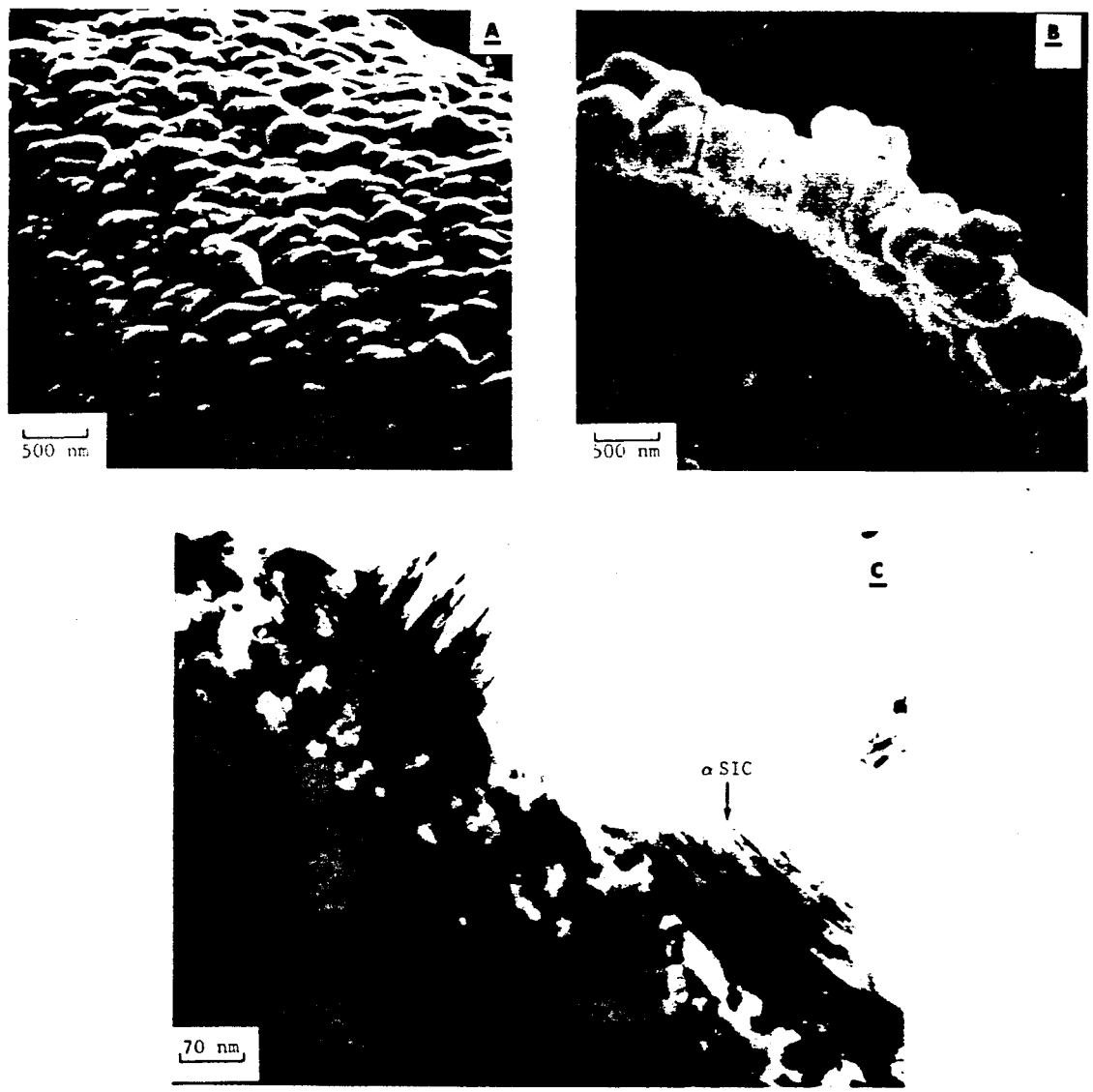
FIG. 2 A) and B) are scanning election micrographs and C) is a transmission electron micrograph (TEM) bright field (BF) of a treated fiber of this invention showing the substantially crystalline alpha silicon carbide outer zone and a microcrystalline beta silicon carbide inner core.

The fracture surfaces of the carbon packed fibers (FIG. 2) which are granular or pebbly with rounded 50-100 nm features on the outer surface resemble a dense, sintered ceramic body. The outer approximately 0.5 um thick exterior shell or zone was found to consist of alpha silicon carbide as opposed to the beta silicon carbide cystallites in the fiber interior (FIG. 2B, C).

The as-received fibers lose strength dropping from 3.5 GPa to 1.2 GPa, when heat treated without carbon for 3 hours at 1600oC in nitrogen. Fibers undergoing carbon packing with an identical heat treatment cycle have a smaller loss, dropping from 3.5 GPa to 1.9-2.5 GPa.

For comparison, tests of carbon packing of the oligomeric and/or polymeric derived silicon carbide fibers were tested by packing the fibers in carbon and annealing the fibers with carbon particles under an argon atmosphere. The fibers produced were brittle and it was impossible to measure tensile strength. No difference is found between carbon packed and unpacked samples of the oligomeric or polymeric derived silicon carbide fibers annealed in an argon atmosphere. TEM microstructural examination shows that the microstructures are virtually identical with no substantial crystal growth evident.

Figure 3:
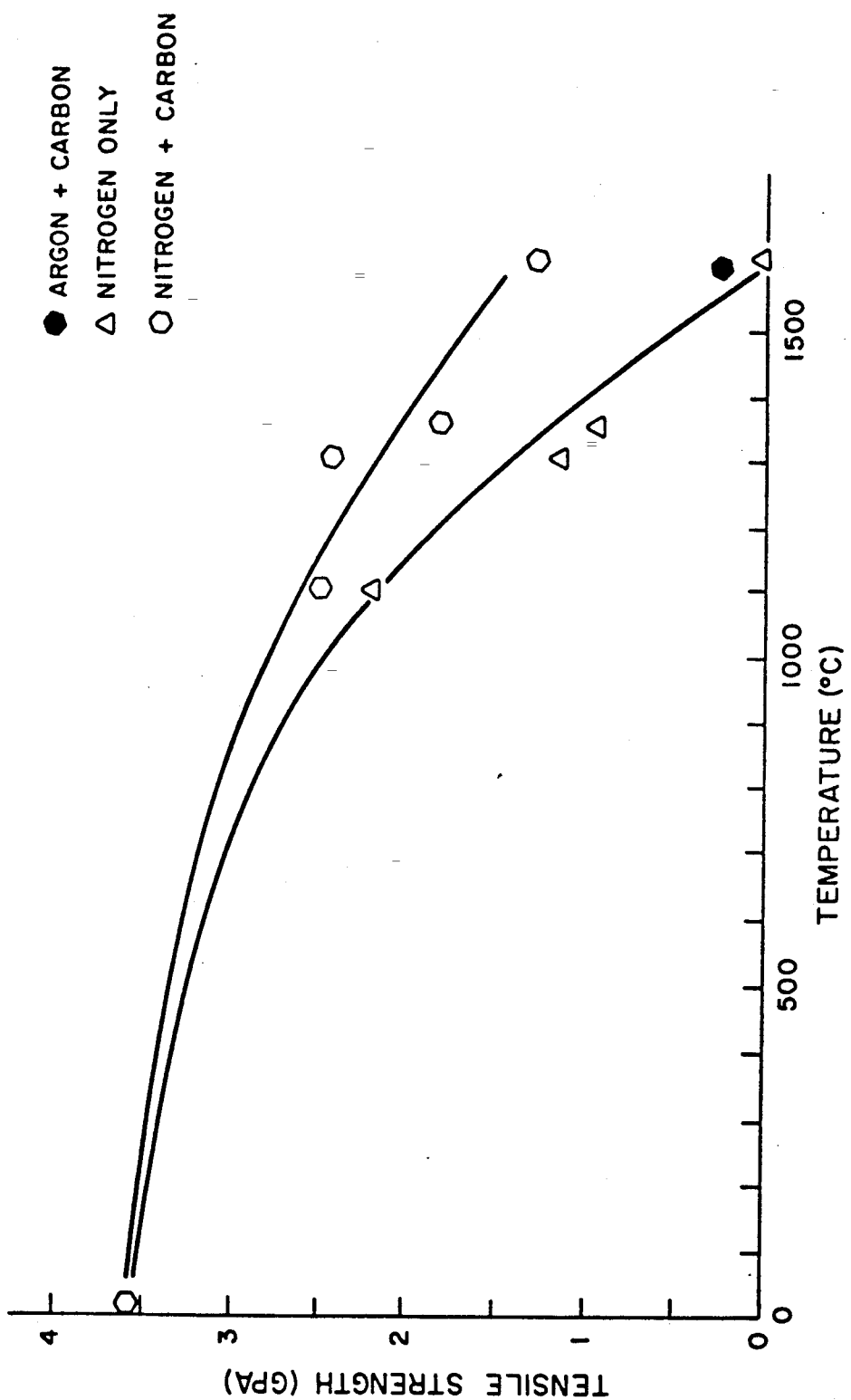
FIG. 3 is a graph comparing the strength of fibers treated under the conditions of this invention to the same fibers treated under different conditions.

The carbon and the gas atmosphere interact to form the improved modified fiber. A comparison of the tensile strength versus temperature for fibers treated with nitrogen and carbon versus fibers annealed in nitrogen only or an argon and carbon environment are shown in FIG. 3.

Although not essential to this invention, an understanding of the believed mechanism may help to understand the scope of the present invention. The method of fiber synthesis used to date results in fibers which contain excess of unreacted oxygen, carbon, silicon, and/or nitrogen.

Prior art untreated fibers also contain unstable microstructures. The fibers are either glassy (amorphous or non-crystalline) or microcrystalline (composed of extremely small crystallites). High temperature exposure tends to convert the glassy material to a crystalline of microcrystalline material. Both effects are detrimental to the strength of the fibers.

Heating the fibers also tends to cause chemical reactions and outgassing. The outgassing typically takes the form of expelling nitrogen, carbon monoxide, or silicon monoxide vapor. Chemical reactions take place both within the structure of the fiber and at its surface to produce side products in the form of other compounds.

It is assumed that the strength degradation of fibers heated in nitrogen atmosphere without carbon present is partially caused by the formation of silicon nitride crystals at or in the surface of the fiber. These crystals are formed by the reaction at the fiber surface of silicon monoxide gas diffusing out of the fibers with nitrogen in the surrounding atmosphere. Thermodynamic calculations indicate that this reaction is a favored reaction, especially since the oxygen produced by the reaction is continuously removed by combination with graphite heaters in the furnace itself.

These silicon nitride crystals are assumed to act as flaws or weak spots causing the fibers to fail when small loads are later applied. Such fibers are also expected not to toughen a ceramic matrix because the fibers would tend to be locked into the matrix by the crystal structure and the fiber would break before it could slide and provide a resilient tough ceramic.

When carbon is present, the reaction goes forward in a similar manner with silicon monoxide gas reacting with nitrogen gas at the fiber surface to form silicon nitride. However, once silicon nitride forms, it further reacts with the carbon present to form a silicon carbide layer on the fiber and evolve nitrogen gas. The crystal structure of this silicon carbide coating layer or zone, which can be seen in FIG. 2, is much smaller than the silicon nitride crystals and would not cause serious flaws.

It is expected that other gases, such as carbon monoxide gas, could function as the interactive gas. In that case the carbon monoxide would interact with the silicon monoxide being exuded at the fiber surface to again form the silicon carbide and evolve oxygen. The chemical reaction mechanism actually occuring is complex and the suppositions made with respect to this mechanism should not be used to limit the invention but should be used to show the full scope and application of the invention.

Obviously, numerous additional modifications and variations of the present invention are possible in light of the above teachings. It is therefore to be understood that within the scope of the appended claims, the invention may be practiced otherwise as is specifically described herein.

What is claimed and desired to be secured by Letters Patent of the United States is:

1. A thermochemically treated surface modified oligomeric- or polymeric derived silicon carbide fiber having increased ability to retain physical and chemical properties after exposure to elevated temperatures so as to be more suitable for use in a composite matrix comprising a silicon carbide fiber derived from the group consisting of organosilicon oligomeric and polymeric precursors annealed at a temperature between 800° C. and 1800° C. in the presence of a gas capable of reacting with the products and byproducts formed during the heating of the oligomeric- or polymeric-derived silicon carbide fiber and in the presence of carbon particles to provide an outer zone of substantially crystalline $\alpha$-SiC upon a core of microcrystalline $\beta$-SiC.

2. A fiber according to claim 1 wherein the gas capable of reacting with the products and byproducts of the heated silicon carbide fiber comprises nitrogen gas.

3. A fiber according to claim 2 wherein the temperature is between 1100° C. and 1600° C.

4. A fiber according to claim 2 wherein the carbon particles are less than 20 microns in size.

5. A fiber according to claim 4 wherein the temperature is below 1600° C.

6. A fiber according to claim 5 wherein the fiber contains titanium.

7. A fiber according to claim 1 wherein the gas capable of reacting with the products and byproducts of the heated silicon carbide fiber comprises carbon monoxide.

8. A silicon carbide fiber derived from the group consisting of organosilicon oligomeric and polymeric precursors and having increased ability to retain physical and chemical properties after exposure to temperatures so as to be more suitable for use in a composite matrix comprising an outer zone of substantially crystalline alpha silicon carbide and a core of microcrystalline beta silicon carbide.

9. A silicon carbide fiber according to claim 10 wherein the core of microcrystalline beta silicon carbide further comprises a doping agent.

10. A silicon carbide fiber according to claim 13 wherein the doping agent comprises titanium.

* * * * *